April 2, 1929.  C. H. BONE  1,707,754

CLAMP

Filed Oct. 12, 1927

C. H. Bone
Inventor

By C. A. Snow & Co.
Attorneys

Patented Apr. 2, 1929.

1,707,754

UNITED STATES PATENT OFFICE.

CHARLES HAROLD BONE, OF DAYTON, OHIO.

CLAMP.

Application filed October 12, 1927. Serial No. 225,748.

This invention has reference to clamps, and more particularly clamps especially designed for laboratory use, the object of the invention being to provide a clamp of this character which will support and clamp articles such as tubing, condensers, flasks, burettes, or the like articles at various angles.

The primary object of the invention is to provide a clamp of this character which will be quick-acting in every respect, novel means being provided for moving the clamping jaws into clamping relation with respect to each other.

Another object of the invention is the provision of a clamp wherein the jaws may be adjusted within a certain range, means being provided for moving the jaws beyond a predetermined point to cause the jaws to clamp the article, thereby adapting the device for use in connection with articles of various sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
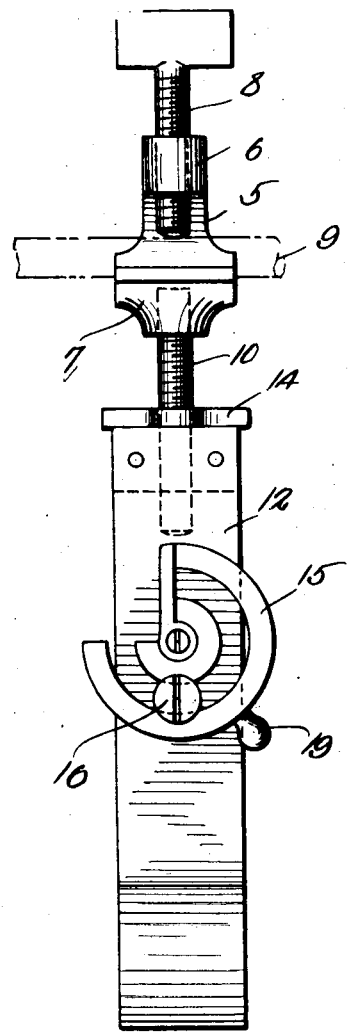
Figure 1 is a front elevational view of a clamp constructed in accordance with the invention.
Figure 2:
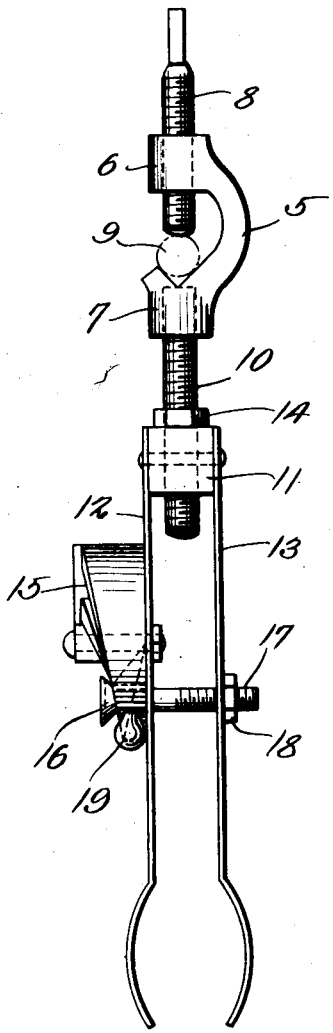
Figure 2 is a side elevational view thereof.

Referring to the drawing in detail, the reference character 5 designates the main or supporting portion of the clamp, which is in the form of jaws 6 and 7 respectively.

The jaw 6 is formed with a threaded opening to receive the threaded bolt 8 that is designed to contact with the supporting rod 9 to force the rod 9 into engagement with the jaw 7, to the end that the main supporting portion 5 may be adjustably secured to the rod 9 so that the clamp may be held at various angles and at various locations throughout the length of the rod 9.

Extending from the main supporting portions 5 is a threaded shank 10 that extends into the block 11 to which the spring jaws 12 and 13 respectively are connected, there being provided a lock nut 14 for locking the jaws in their positions of adjustment. Thus it will be seen that due to this construction, the clamp may be lengthened or shortened at the will of the user.

Pivotally mounted on the jaw 12 is a cam 15 the inclined upper surface thereof contacting with the head 16 of the screw 17 that passes through openings in the jaws 12 and 13 to limit movement of the jaws with respect to each other. A nut 18 is positioned on the screw 17 and contacts with the jaw 13 so that by operating the nut 18 an adjustment may be made of the jaws to move the jaws towards or away from each other, this adjustment being necessary to cause the jaws 12 and 13 to be normally held in position so that the space between the jaws will be approximately the same as the thickness of the article to be clamped.

A finger piece 19 extends from the cam 15 and affords means whereby the cam may be rotated to cause the jaws to move into clamping relation with the article being clamped.

From the foregoing it will be seen that due to this construction, the jaws 12 and 13 may be adjusted so that they will fit around an article to be clamped, whereupon the cam 15 is moved under the head 16 of the screw 17, moving the jaws into such close relation with each other that the article supported thereby will be gripped and held against movement between the jaws.

If it should be desired to release the article, it is obvious that it will be only necessary to move the cam 15 in the opposite direction, thereby allowing the jaws to spring to their normal or inactive positions.

I claim:—

In a clamp, a main supporting portion, means for securing the main supporting portion to a supporting rod, a threaded shank forming a part of the main supporting portion, a block having a threaded opening to receive the threaded shank to adjustably secure the block to the shank, spring jaws secured to opposite sides of the block, means on the jaws for moving the jaws with respect to each other, and means for locking the block in its positions of adjustment on the threaded shank.

In testimony that I claim the foregoing as my own, I have hereto affixed my signature.

CHARLES HAROLD BONE.